United States Patent [19]

Turner et al.

[11] Patent Number: 5,630,603

[45] Date of Patent: May 20, 1997

[54] RETRACTABLE TRAILER COUPLING ASSEMBLY

[76] Inventors: Thomas D. Turner; Donna N. Turner, both of 4318 Hollygrove St., New Orleans, La. 70118

[21] Appl. No.: 396,974

[22] Filed: Mar. 1, 1995

[51] Int. Cl.$^6$ ................................................. B62D 53/08
[52] U.S. Cl. ................ 280/407.1; 280/408; 280/476.1; 280/149.2
[58] Field of Search ................................ 280/405.1, 406.1, 280/407, 407.1, 408, 410, 476.1, 482, 491.1; 229/60, 57, 74, 76, 336.3, DIG. 30, 61; 74/551.2, 543, 491

[56] References Cited

U.S. PATENT DOCUMENTS

| | | | |
|---|---|---|---|
| 1,718,995 | 7/1929 | Barnard | 292/60 |
| 2,223,275 | 11/1940 | Valenzuela | 292/60 |
| 3,066,953 | 12/1962 | Chosy | 280/418 |
| 3,374,010 | 3/1968 | Crockett et al. | 280/415 |
| 3,774,940 | 11/1973 | Merritts | 280/408 |
| 3,922,897 | 12/1975 | Mickelson | 70/232 |
| 3,933,374 | 1/1976 | Arguin | 280/408 |
| 4,365,820 | 12/1982 | Rush | 280/476.1 |
| 4,400,004 | 8/1983 | Arguin | 280/407.1 |
| 4,447,071 | 5/1984 | Kaplan | 280/482 |
| 4,673,191 | 6/1987 | Arguin | 280/408 |
| 4,838,754 | 6/1989 | Beliles et al. | 414/607 |
| 4,877,293 | 10/1989 | French et al. | 280/405.1 |
| 4,955,629 | 9/1990 | Todd et al. | 280/407 |
| 5,011,176 | 4/1991 | Eppinette | 280/482 |
| 5,127,663 | 7/1992 | Whitehead | 280/404 |
| 5,163,698 | 11/1992 | Evens | 280/404 |
| 5,451,069 | 9/1995 | Schueman | 280/405.1 |

*Primary Examiner*—Anne Marie Boehler
*Attorney, Agent, or Firm*—Joseph N. Breaux

[57] ABSTRACT

A retractable trailer coupling assembly rearwardly disposable from a trailer and adapted for towing an additional trailer having a coupling frame, in mechanical connection with the underside of the trailer; a coupling dolly, having a fifth wheel, adapted for towing a trailer, and an axle carrier, in slidable connection with the coupling frame between a first position wherein the axle carrier and the fifth wheel are entirely positioned under the trailer and a second position wherein the axle carrier and the fifth wheel are positioned a sufficient distance rearward of the trailer to allow connection of the additional trailer. A lock is in functional connection between the coupling frame and the coupling dolly, for selectively locking the coupling dolly in a fixed relationship with the coupling frame in the first and second positions.

1 Claim, 6 Drawing Sheets

RETRACTABLE TRAILER COUPLING ASSEMBLY

TECHNICAL FIELD

The present invention relates to devices for towing trailers and more particularly to devices which are retractable from underneath a trailer and capable of connecting with an additional trailer.

BACKGROUND ART

In the trucking industry there is a continuous desire to increase profits. One method of achieving this goal is to increase per trip carrying capacity. This is often achieved by towing tandem trailers and at times towing triples. However, it is often impractical to tow tandem-trailers and triples are outlawed in many states. Generally, detachable hitches are used to tow additional trailers. These hitches require additional storage space when not in use. These hitches also require more than one person to install and installation can be time consuming.

It would be a benefit, therefore, to have a trailer coupling assembly which may be retracted under a trailer when not in use for towing additional trailers. It would be a further benefit to have a trailer coupling assembly which may be extended and hitched to an additional trailer by a sole operator within minutes.

GENERAL SUMMARY DISCUSSION OF INVENTION

It is thus an object of the invention to provide a retractable trailer coupling assembly that allows for an additional trailer to be towed.

It is a further object of the invention to provide a retractable trailer coupling assembly that may be retracted under a trailer when not in use.

It is a still further object of the invention to provide a retractable trailer coupling assembly that has a locking mechanism to maintain the trailer coupling assembly in a set position.

It is a still further object of the invention to provide a retractable trailer coupling assembly that may be placed into or taken out of service within minutes.

Accordingly, an improved retractable trailer coupling assembly is provided of the type rearwardly disposable from a trailer and adapted for towing an additional trailer. The improvement comprises: a coupling frame, in mechanical connection with the underside of the trailer; a coupling dolly in slidable connection with the coupling frame; and a locking mechanism, in functional connection between the coupling frame and the coupling dolly, for selectively locking the coupling dolly in a fixed relationship with the coupling frame in a first and second position.

The coupling dolly includes a fifth wheel, adapted for towing a trailer, and an axle carrier to which the rear tires of the trailer are connected. In the first position the axle carrier and the fifth wheel are entirely positioned under the trailer. In the second position the axle carrier and the fifth wheel are positioned a sufficient distance rearward of the trailer to allow connection of the additional trailer.

The locking mechanism includes a pin having a handle attached to one end and a spring that forces the pin into securing connection between the coupling frame and the coupling dolly preventing the coupling dolly from sliding in relation to the coupling frame. The locking mechanism preferably includes a mechanism for locking the pin in a position wherein the pin is disengaged from the coupling dolly and the coupling dolly is slidable with respect to the coupling frame. In a preferred embodiment, the locking mechanism includes a bracket, having an aperture passing therethrough; two support posts, extending perpendicularly from the bracket adjacent to the aperture and attached to the coupling frame; a pin, slidably disposed through the aperture; a handle, connected to one end of the pin; a spring plate, rigidly attached around the midpoint of the pin; and a spring, encircling the pin and entrapped between the bracket surface and the spring plate in a manner such that the spring urges the free end of the pin through an aperture formed through the coupling frame.

The locking mechanism handle preferably includes a hand passageway to allow the handle to be grasped by placing the fingers through the hand passageway and wrapped about a section of the handle. The bracket preferably includes a pair of support posts, extending from the bracket in the direction of the handle, and the handle and pin are preferably rotatable with respect to the bracket when the pin is in the fully retracted position. This configuration allows the pin to be secured in the fully retracted position by rotating and positioning the handle onto the support posts. The coupling dolly may be moved between the first and second positions when the pin is in the fully retracted position.

The retractable coupling assembly preferably includes a positioning mechanism having an elongated positioning slot, and a sliding post slidably entrapped therein. When the coupling dolly is positioned in the first position, the sliding post contacts the first end of the positioning slot. When the coupling dolly is positioned in the second position, the sliding post contacts the second slot end of the positioning slot.

In another preferred embodiment, the coupling frame includes a pair of elongated T-shaped members oriented parallel to each other and the coupling dolly includes a pair of trackway members. Each trackway member slidably entraps a portion of one of the T-shaped members allowing the coupling dolly to slide along an axis parallel with the coupling frame.

In this embodiment, the locking mechanism may include a forward and a rear locking aperture formed through each of the T-shaped members and a pin aperture formed through each trackway member. Each of the trackway members includes a locking mechanism having a handle and pin as previously described. Each pin aperture is concentrically aligned with the forward locking aperture when the coupling dolly is positioned in the first position and aligned with the rear locking aperture when the coupling dolly is positioned in the second position. The coupling frame is locked by allowing the spring of each of the locking mechanisms to urge its respective pin through the pin aperture and one of the locking apertures of the T-shaped member.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
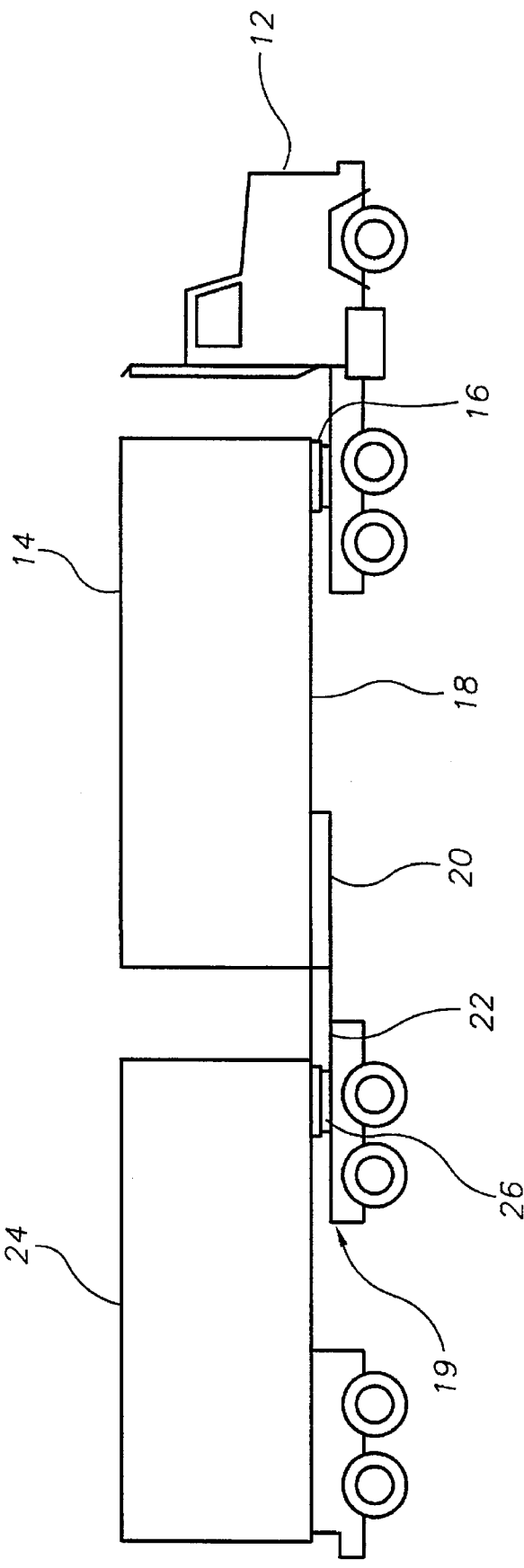
FIG. 1 is a side view of an exemplary embodiment of the retractable trailer coupling system, with a second trailer in tow.

FIG. 1 is a side view of an exemplary embodiment of the improved retractable trailer coupling assembly 19 in connection with a trailer 14. In the figure, trailer 14 is connected to a tractor 12 in the normal fashion and connected to a second trailer 24 using retractable trailer coupling assembly 19. Retractable trailer coupling assembly 19 includes coupling frame 20 and coupling dolly 22. Coupling frame 20 is rigidly attached to an underside 18 of trailer 14. Coupling dolly 22 is slidable between the rearward position illustrated in the figure and a forward position in which the coupling dolly is located beneath the rear section of trailer 14. The figure also shows a second trailer 24 having a king pin 26 in connection with the coupling dolly 22 of the coupling assembly 19.

Figure 2:
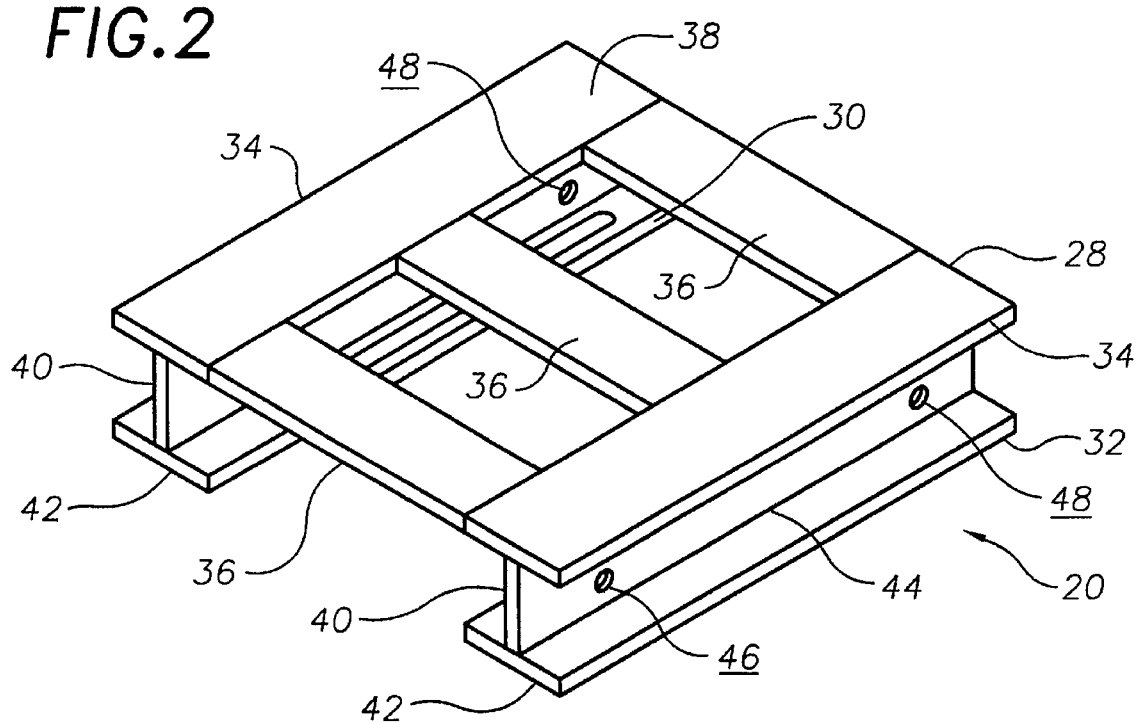
FIG. 2 is an isometric view of the coupling frame.

FIG. 2 is a isometric view of coupling frame 20. Coupling frame 20 includes mating frame 28, a first elongated T-shaped member 30, and a second elongated T-shaped member 32. Mating frame 28 is constructed of two elongated planar members 34, oriented in a parallel manner and spaced by three slats 36, forming a first surface 38. First surface 38 is connected to underside 18 of trailer 14 (FIG. 1).

Elongated T-shaped members 30,32 have a first planer member 40, having a first edge 44, and planar track member 42. First edge 44 is welded to planar track member 42 along a line longitudinally bisecting planar track member 42. T-shaped members 30,32 are connected to mating frame 28 by welding.

Figure 3:
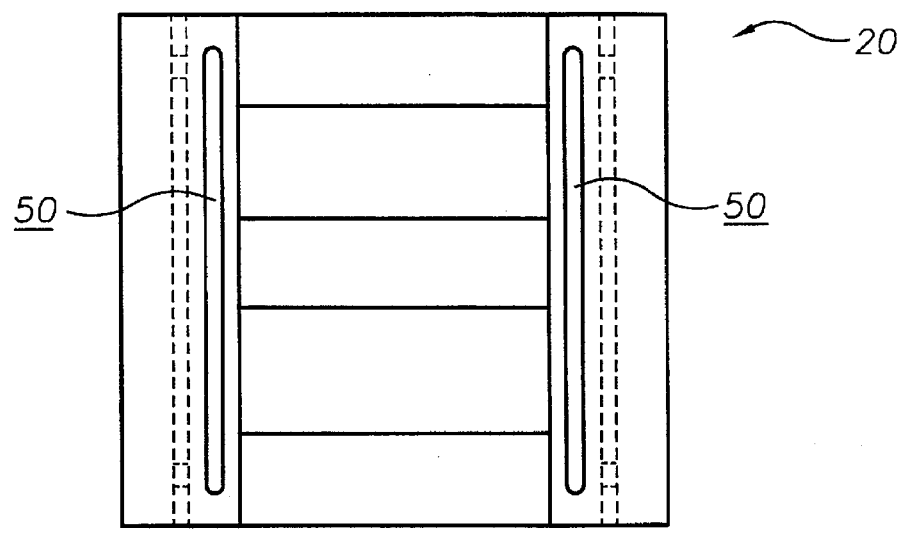
FIG. 3 is a bottom view of the coupling frame.

First planar members 40 include rear locking apertures 46 and forward locking apertures 48. As shown in FIG. 3, each planar track member 42 has an elongated positioning slot 50 formed therethrough and located on adjacent sections of each planar track member 42.

Figure 4:
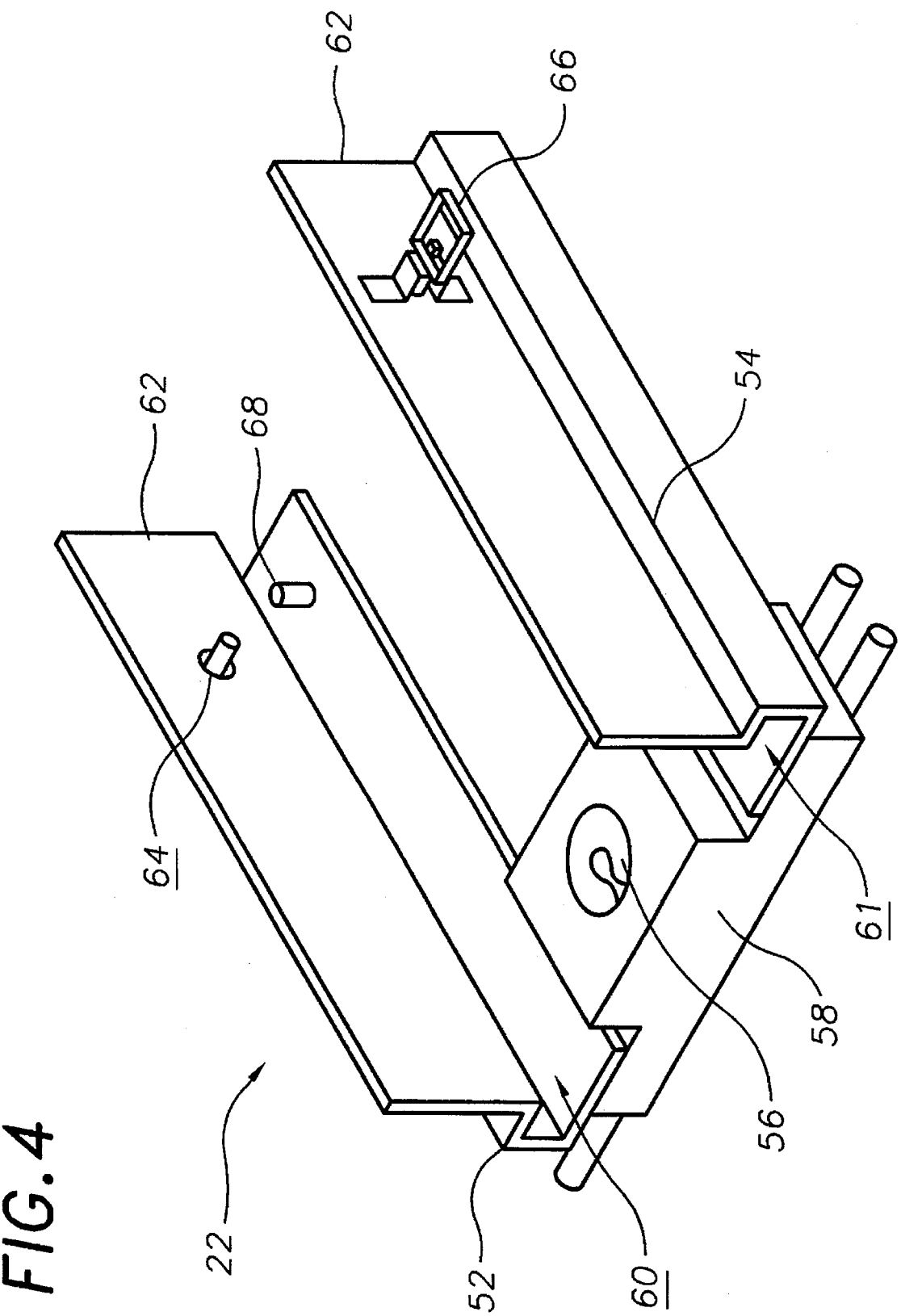
FIG. 4 is an isometric view of the coupling dolly.

FIG. 4 is an isometric view of coupling dolly 22 in isolation. Coupling dolly 22 includes a first trackway member 52, a second trackway member 54, and a fifth wheel 56 centered and mounted atop an axle carrier 58.

First trackway member 52 is constructed of two right angled members forming a first track channel 60 and a vertical section 62. Secondtrack way member 54 is constructed of two right angled members forming a second track channel 61 and a vertical section 62. Vertical sections 62 have a pin aperture 64 centered thereon. Each vertical section 62 has a locking mechanism 66 having a pin 74 mounted thereon in a manner such that pin 74 may pass through pin aperture 64. Trackway members 52,54 have a slidable post 68 extending vertically therefrom. When coupling dolly 22 and coupling frame 20 are connected, each slidable post 68 is slidably entrapped within positioning slot 50 of planar track members 42 (FIG. 3).

Axle carrier 58 is connected to the underside of trackway members 52,54 in a manner such that fifth wheel 56 is centered between first trackway member 52 and second trackway member 54.

Figure 5:
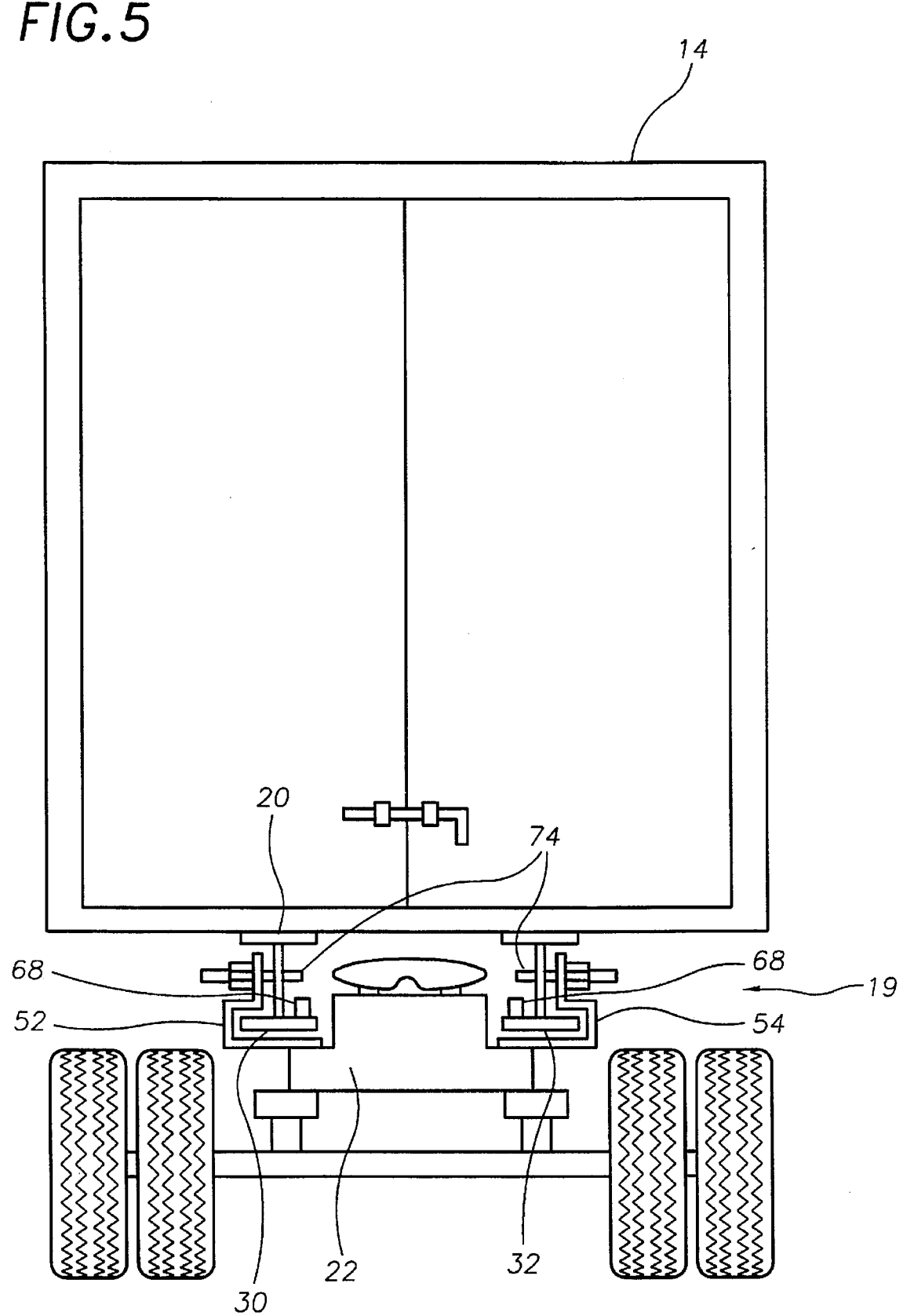
FIG. 5 is a rear view of the trailer coupling assembly in the retracted mode.

FIG. 5 is a rear view of trailer 14 with coupling assembly 19 shown in the retracted position. The figure shows trackways 52,54 slidably entrapping T-shaped members 30,32, forward locking apertures 48 (FIG. 2) concentrically aligned with pin apertures 64 (FIG. 4), and pin 74 passing through both pin aperture 64 and forward locking aperture 48, In this configuration, coupling dolly 22 is locked in a fixed relationship with coupling frame 20. Sliding posts 68 are shown slidably entrapped within elongated positioning slots 50 (FIG. 3).

Figure 6:
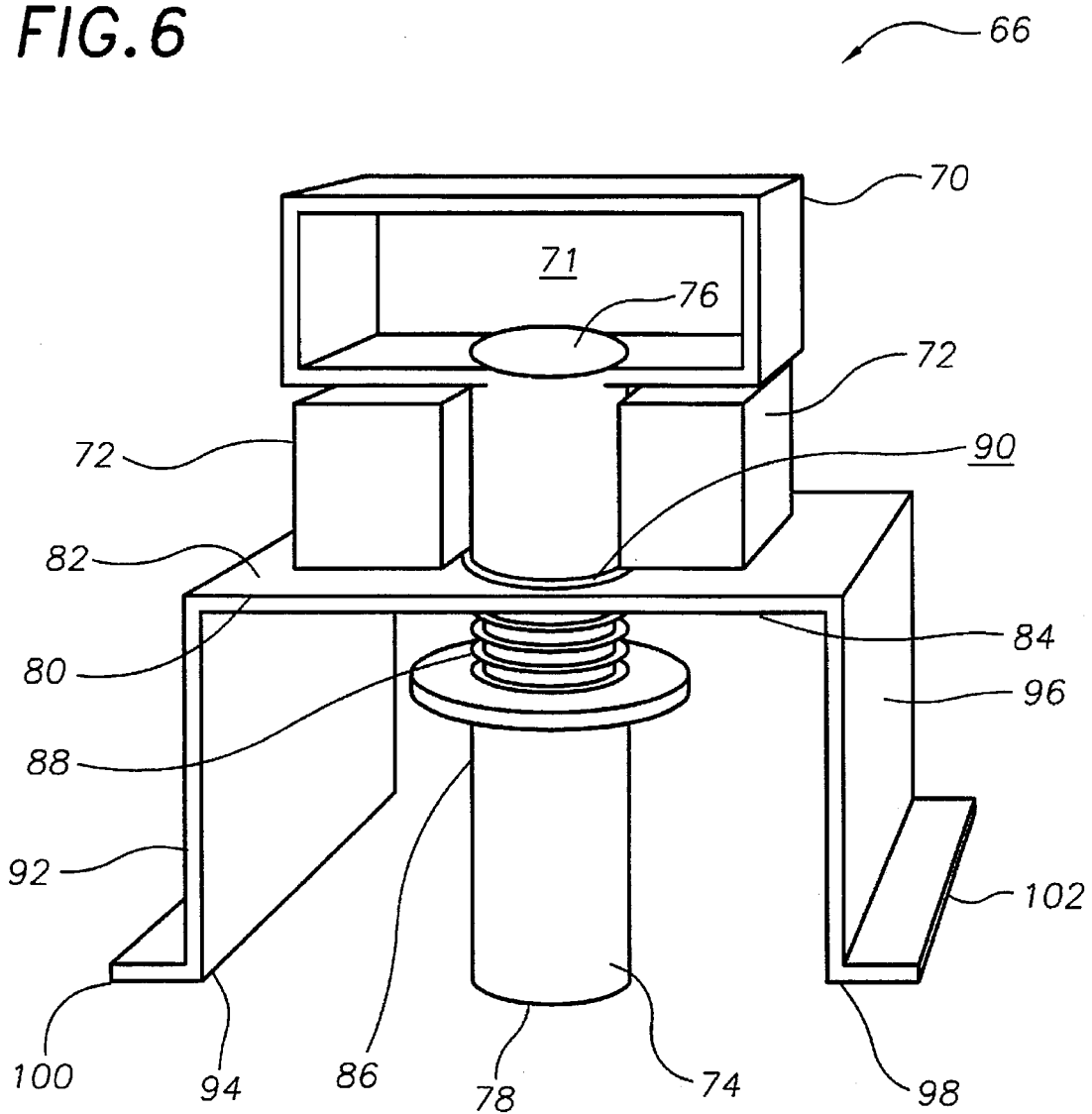
FIG. 6 is a perspective of the locking mechanism.

FIG. 6 is a perspective view of one locking mechanism 66. Each locking mechanism 66 includes a handle 70, two support posts 72, a pin 74 having an initial end 76 and a terminal end 78, a bracket 80 having a first surface 82 and a second surface 84, a spring plate 86, and a spring 88.

Bracket 80 has an aperture 90 centered thereon and of a diameter sufficient to snugly pass pin 74. Extending perpendicularly from second surface 84 is first leg member 92, having a first terminal end 94, and second leg member 96, having a second terminal end 98. Extending perpendicularly from first terminal end 94 is first foot 100 and extending perpendicularly from second terminal end 98 is second foot 102. Mounted adjacent to aperture 90 and extending vertically are support posts 72.

Pin 74 is slidably disposed through aperture 90 with terminal end 78 extending between leg members 92,96. Handle 70, having a hand passageway 71, is horizontally mounted on initial end 76. Pin 74 is of a length sufficient to extend beyond leg members 92,96 locking coupling dolly 22 in a fixed relationship with coupling frame 20 (FIG. 5). Spring plate 86 is mounted on pin 74 approximately midway between bracket 80 and terminal end 78. Spring 88 encircles pin 74 between bracket 80 and spring plate 86, in a manner such that initial end 76 is urged towards aperture 90. Foot members 100,102 are attached to vertical section member 58 (FIG. 4) such that pin 72 is concentrically aligned with pin aperture 54.

Figure 7:
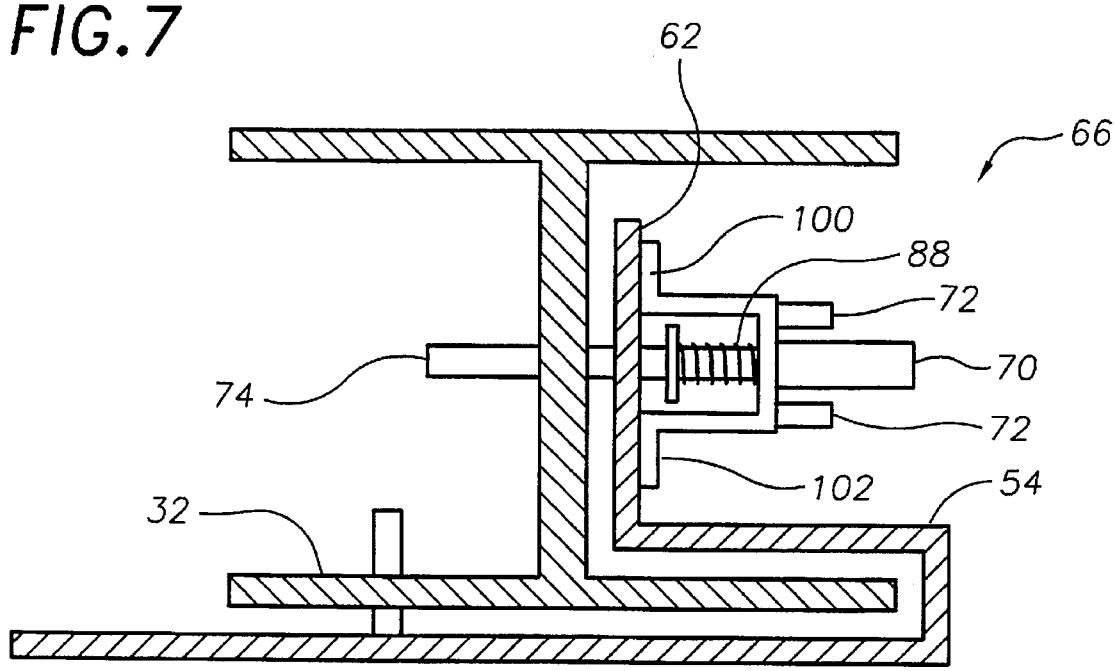
FIG. 7 is a cross-sectional view of the locking mechanism in the locked position.

FIG. 7 is a cross-sectional view of locking mechanism 66 in the locked position. The figure shows T-shaped member 32 entrapped by trackway member 54 and locked in a fixed relationship. Foot members 100,102 are connected to vertical section 62 in a manner such that pin 74 is concentrically aligned with pin aperture 64 (FIG. 4) and forward locking apertures 48 (FIG. 2). When handle 70 is rotated in a manner allowing it to pass between support posts 72, spring 88 expands urging pin 74 through pin aperture 64 (FIG. 4) and forward locking aperture 48 (FIG. 2), locking trackway member 54 in the retracted position place.

Figure 8:
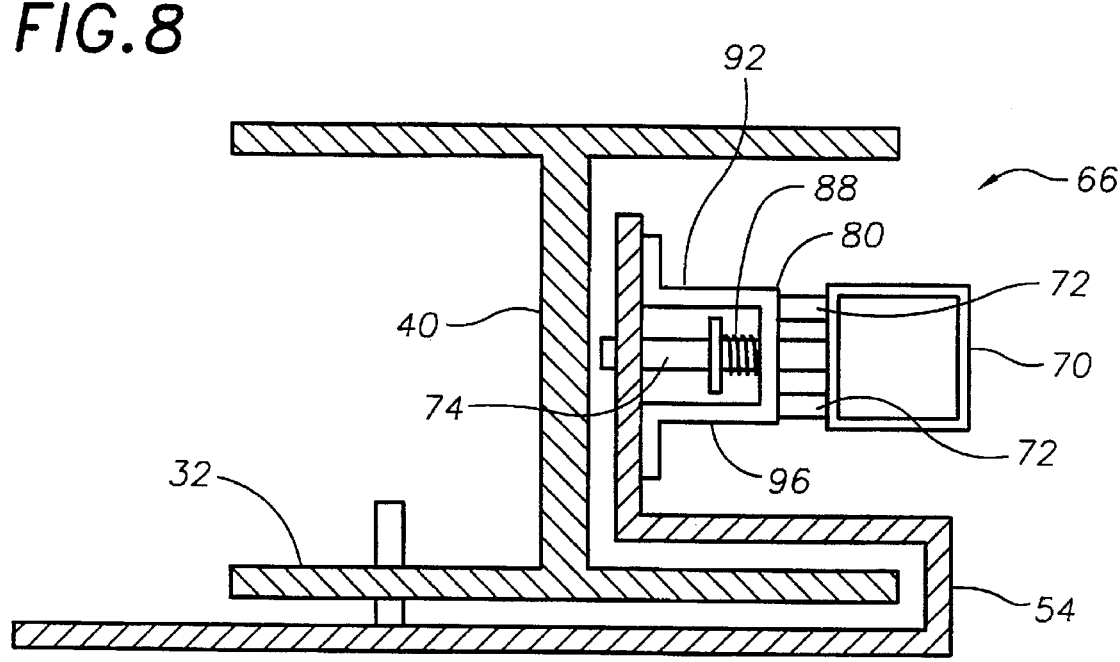
FIG. 8 is a cross-sectional view of the locking mechanism in the unlocked position.

FIG. 8 is a cross-sectional view of locking mechanism 66 in the unlocked position. When handle 70 is urged away from bracket 80, spring 88 is compressed and pin 74 is entirely retracted from first planar member 40. When pin 74 is entirely retracted from first planar member 40, trackway member 54 is slidable along T-shaped member 32. Leg members 92,96 are of a length sufficient to retract pin 74 entirely from first planar member 40. Rotating handle 70 to a position aligned with and resting atop supporting posts 72 maintains locking mechanism 66 in the unlocked position. Supporting posts 72 being of a height sufficient to maintain pin 74 entirely withdrawn from first planar member 40.

Use of the coupling assembly 19 is simple. When it is required to connect a second trailer 24 in tandem with a first trailer 14 having the coupling assembly 19, both locking mechanisms 66 are unlocked and the handles 70 positioned onto supporting posts 72 as previously described. The brakes of the trailer wheels are then applied as the tractor 12 is placed in a forward gear and moved in the forward direction. As the tractor 12 moves forward it pulls trailer 14 along with it and the coupling frame into the second position. Once the second position is reached the braking action of the trailer wheels signals the driver that the coupling dolly is located in the second position. The driver then dismounts the tractor and locks the coupling dolly in place. The coupling dolly 19 is returned to the first position by repeating the steps while placing the tractor in reverse instead of in a forward gear.

It can be seen from the preceding description that a device for towing an additional trailer, which may be retracted under a trailer when not in use, with a locking mechanism to maintain the trailer coupling system in position and may be placed into or taken out of service within minutes, has been provided.

It is noted that the embodiment of the retractable trailer coupling assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A retractable trailer coupling assembly rearwardly disposable from a trailer and adaptable for towing an additional trailer, the improvement comprising:

a) a coupling frame, in mechanical connection with the underside of said trailer;

b) said coupling frame having a first and a second elongated T-shaped member oriented in a manner parallel to each other;

c) each said T-shaped member having a first planar member, having a first edge, and a planar track member;

said first edge of said first planar member being connected to said planar track member along the midpoint axis of said planar track member and extending perpendicularly therefrom;

d) said first planar member has a forward and a rear locking aperture formed therethrough;

e) a coupling dolly, having a fifth wheel and an axle carrier, in slidable connection with said coupling frame between a first position wherein said axle carrier and said fifth wheel are entirely positioned under said trailer and a second position wherein said axle carrier and said fifth wheel are positioned a sufficient distance rearward of said trailer to allow connection of said additional trailer;

f) said coupling dolly has a first and a second trackway member;

g) said first elongated trackway member has two right angle members forming a first track channel enclosed on three sides with a vertical section extending upward from said track channel; and said second elongated trackway member has two right angle members forming a second track channel enclosed on three sides with a vertical section extending upward from said track channel;

said first track channel slidably entrapping a portion of said first T-shaped member in a manner such that said coupling dolly is slidable along an axis parallel with said coupling frame;

said second track channel slidably entrapping a portion of said second T-shaped member;

h) said vertical section of each said trackway member having a pin aperture formed therethrough;

said pin aperture being concentrically aligned with said forward locking aperture when said coupling dolly is positioned in said first position, said pin aperture being concentrically aligned with said rear locking aperture when said coupling dolly is positioned in said second position;

I) locking means, in functional connection between said coupling frame and said coupling dolly, for locking said coupling dolly in a fixed relationship with said coupling frame in said first position and said second position, said locking means including a bracket, having a first surface and a second surface and a concentric aperture passing therethrough; two support posts, extending perpendicularly from said first surface and located adjacent to said concentric aperture; a pin having an initial end and a terminal end, said pin passing through said concentric aperture; a handle, connected to said initial end; a spring plate, mounted around said pin midway between said second surface and said terminal end; and a spring, encircling said pin between said second surface and said spring plate;

j) said handle forming a hand passageway having a cross-section sufficient to fit a hand therethrough in a manner such that said pin may be urged in a first direction and said pin may be rotated laterally along a longitudinal axis;

k) said bracket further includes a first and second leg member extending outwardly from said second surface in a manner such that said first and second leg members are oriented substantially parallel with one another;

l) said first leg member further includes a first foot connected to a first terminal end of said first leg member; and said second leg member further includes a second foot connected to a second terminal end of said second leg member;

said first and said second foot being connected to said vertical section of said trackway adjacent to said pin aperture in a manner such that said pin is concentrically aligned with said pin aperture;

m) said leg members having a length sufficient to allow said pin to be urged in said first direction a distance sufficient to remove said pin entirely from said locking aperture releasing said coupling dolly from said fixed relationship with said coupling frame;

n) said support posts being of a height such that when said pin is urged in said first direction, a distance sufficient to release said coupling dolly from said fixed relationship with said coupling frame, said handle may be rotated in a manner such that said handle is aligned and situated atop said support posts maintaining said pin in a position releasing said coupling dolly; and o) said planar track member of each said T-shaped member forming an elongated positioning slot therethrough, having a first slot end and a second slot end; and each said trackway member has a sliding post extending substantially perpendicularly therefrom;

said sliding post being slidably entrapped within said elongated positioning slot, said sliding post contacting said first slot end when said coupling dolly is positioned in said first position and contacting said second slot end when said coupling dolly is positioned in said second position.

* * * * *